(12) United States Patent
Schmid et al.

(10) Patent No.: US 8,091,405 B2
(45) Date of Patent: Jan. 10, 2012

(54) DEVICE AND METHOD FOR CALIBRATING A PIPETTE OR A DISPENSING SYSTEM

(75) Inventors: Noa Schmid, Wuppenau (CH); Janko Auerswald, Lucerne (CH); Thomas Stöckli, Sarnen (CH); Helmut Knapp, Ebikon (CH)

(73) Assignee: CSEM Centre Suisse d'Electronique et de Microtechnique SA-Recherche et Developpement, Neuchâtel (CH)

( * ) Notice: Subject to any disclaimer, the term of this patent is extended or adjusted under 35 U.S.C. 154(b) by 675 days.

(21) Appl. No.: 11/900,543

(22) Filed: Sep. 12, 2007

(65) Prior Publication Data
US 2008/0066523 A1 Mar. 20, 2008

(30) Foreign Application Priority Data
Sep. 19, 2006 (EP) .................................... 06019512

(51) Int. Cl.
*G01F 19/00* (2006.01)
(52) U.S. Cl. ........................................................ 73/1.74
(58) Field of Classification Search .................... 73/1.74
See application file for complete search history.

(56) References Cited

U.S. PATENT DOCUMENTS

| | | | | |
|---|---|---|---|---|
| 3,084,067 A | * | 4/1963 | Smith | 428/351 |
| 3,915,652 A | * | 10/1975 | Natelson | 422/65 |
| 4,028,540 A | * | 6/1977 | Key et al. | 362/118 |
| 4,354,376 A | | 10/1982 | Greenfield et al. | |
| 4,728,568 A | * | 3/1988 | Sasada et al. | 428/349 |
| 4,791,438 A | * | 12/1988 | Hanson et al. | 347/87 |
| 5,061,639 A | | 10/1991 | Lung et al. | |
| 5,260,030 A | * | 11/1993 | DeVaughn | 422/100 |

(Continued)

FOREIGN PATENT DOCUMENTS
DE    31 43 341    5/1983
(Continued)

OTHER PUBLICATIONS

European Search Report issued Jan. 31, 2007 in corresponding EP06019512.0, 5 pages.

*Primary Examiner* — Robert Raevis
(74) *Attorney, Agent, or Firm* — Marshall, Gerstein & Borun LLP

(57) ABSTRACT

The present invention relates to a device (1) for calibrating a pipette or a dispensing system comprising a plate (2), said plate (2) comprising at least one channel (3) with a loading port (4) for receiving a test volume of a fluid at one end of the at least one channel and an opening (5) at the other end of the at least one channel, wherein the at least one channel (3) is constructed as a capillary. Furthermore, the invention relates to a method for calibrating a pipette or a dispensing system, comprising the steps of introducing a first volume of a fluid into a loading port (4) of a device (1), recording a first length of the fluid column in a channel (3) of the device (1), introducing a second volume of a fluid from the pipette or the dispensing system to be calibrated to the same loading port (4), recording a second length of the fluid column in the channel (3), and computing the volume dispensed by the pipette or the dispensing system by calculating the distance between the second length and the first length and multiplying said distance with the cross-section of the channel (3).

16 Claims, 2 Drawing Sheets

U.S. PATENT DOCUMENTS

| | | |
|---|---|---|
| 5,298,978 A | 3/1994 | Curtis et al. |
| 5,329,294 A * | 7/1994 | Ontawar et al. ............... 347/87 |
| 5,481,900 A * | 1/1996 | Husar ............................ 73/114 |
| 5,492,673 A | 2/1996 | Curtis et al. |
| 6,455,787 B1 | 9/2002 | Ingenhoven |
| 6,615,638 B1 | 9/2003 | Lochner et al. |
| 7,204,960 B2 * | 4/2007 | Hui et al. ................. 422/82.05 |
| 2002/0009392 A1 * | 1/2002 | Wolk et al. ..................... 422/63 |
| 2002/0124627 A1 * | 9/2002 | Luchinger ...................... 73/1.74 |
| 2004/0255641 A1 * | 12/2004 | Preckel et al. ................. 73/1.74 |
| 2006/0213775 A1 * | 9/2006 | Ohashi et al. ................. 204/601 |
| 2006/0272387 A1 * | 12/2006 | Klosterman et al. ........... 73/1.74 |
| 2008/0003572 A1 * | 1/2008 | Delamarche et al. ............. 435/6 |

FOREIGN PATENT DOCUMENTS

| | | |
|---|---|---|
| DE | 32 39 820 | 5/1984 |
| DE | 44 37 610 | 4/1996 |
| EP | 0 193 158 | 9/1986 |
| WO | WO 2005/099901 | 10/2005 |

* cited by examiner ly known. Calibration methods for pipettes based on gravimetric analysis are among others described in patent documents U.S. Pat. No. 6,804,985 B2, U.S. Pat. No. 6,455,787 B1, and U.S. Pat. No. 6,615,638 B1.

DEVICE AND METHOD FOR CALIBRATING A PIPETTE OR A DISPENSING SYSTEM

FIELD OF THE INVENTION

The present invention relates to a device for calibrating a pipette or a dispensing system and to a method for calibrating a pipette or a dispensing system.

DESCRIPTION OF THE PRIOR ART

Existing techniques for calibrating pipettes are generally based on the so-called gravimetric analysis. Samples of distilled water are dispensed into a receiving vessel that is perched atop a precision analytical balance. The density of water constitutes a well known constant and the weight of the dispensed sample provides an accurate indication of the volume dispensed. A condition for applying the gravimetric method is that the density of the fluid to be measured is known in advance. The gravimetric method is especially suited for calibrating low-volume pipettes in the region of less than two microlitres. The inherent uncertainties of the gravimetric method, at least when performed with standard laboratory balances, can become quite excessive. In such cases properly calibrated so-called micro-balances can be used which, however, are rather expensive. Calibration methods for pipettes based on gravimetric analysis are among others described in patent documents U.S. Pat. No. 6,804,985 B2, U.S. Pat. No. 6,455,787 B1, and U.S. Pat. No. 6,615,638 B1.

Other known calibration techniques are based on the so-called colorimetric method. According to the colorimetric method a photometer is used to measure the absorbance of different wavelengths before and after the dispensing of a sample fluid. The rate of absorbance is directly proportional to the concentration according to Beer's law and therefore verification of the dispensed volume is possible (confer for example patent documents U.S. Pat. No. 5,298,978 A, U.S. Pat. No. 5,061,639 A, U.S. Pat. No. 4,354,376 A, and U.S. Pat. No. 5,492,673 A).

Colorimetric and gravimetric devices for pipette calibration are usually relatively expensive, and the usage for small volume calibration can be rather limited because of evaporation issues.

SUMMARY OF THE INVENTION

It is an object of the invention to provide a device for calibrating a pipette or dispensing system that can be manufactured relatively economically. It is a further object of the invention to provide a device for calibrating a pipette or a dispensing system and a corresponding method for calibrating a pipette or a dispensing system that can be employed without the density of the fluid to be measured to be known in advance.

In order to implement these and still further objects of the invention, which will become more readily apparent as the description proceeds, a device for calibrating a pipette or a dispensing system is provided, the device having a plate and the plate comprising at least one channel with a loading port for receiving a test volume of a fluid at one end of the at least one channel and an opening at the other end of the at least one channel, wherein the at least one channel is constructed as a capillary. The expression "the other end of the at least one channel" defines that end of the at least one channel that is located opposite to that end of the at least one channel to which the loading port is assigned. The expression "pipette" covers among others manual pipettes, multipipettes or automated pipetting systems. The expression "dispensing systems" also covers metering systems. Calibration in the sense of the invention means the verification of a dispensed volume by using a standard device. The device according to the invention constitutes such a standard device.

The at least one channel is preferably located visibly in a surface of the plate and is covered by a tape or a film, in particular by a coated hydrophilic tape. For most precise functioning of the device, the dispensed test volume of the fluid has basically to be wicked completely into the channel. In order to achieve this, the channel and/or the tape are preferably hydrophilic. The tape is preferably transparent so that a user is actually able to see a fluid column in the channel. Additionally or alternatively the plate material may be transparent.

The plate material preferably comprises or entirely consists of glass or a transparent plastic material such as PMMA (polymethyle methacrylate), PC (polycarbonate), COC (cycloolefinecopolymer), PS (polystyrene), PE (polyethylene), or PP (polypropylene). Glass in itself constitutes a hydrophilic material, leading to hydrophilic channels.

The plate or the tape may be made of metal provided that at least one of the plate or the tape is made of transparent material. That is, the plate may be made of metal if the tape is made of transparent material and the tape may be made of metal if the plate is made of transparent material.

Alternatively or additionally the plate material can be specifically coated, in particular sugar-base-coated to enhance the hydrophilic effect. Relatively inexpensive hydrophilic coating can by achieved with a so-called corona-aerosol treatment. This coating technique can be employed at atmospheric pressure.

The plate material can also comprise surface-treated plastic, with the surface having been treated with plasma and/or UV-light to enhance the hydrophilic effect. Furthermore, for achieving high hydrophilicity, the channel advantageously has no sharp edges.

The device for calibrating according to the invention can be manufactured relatively inexpensively and the user does not need any further expensive calibration equipment such as a precision balance or a photometer, such being the case for known calibration methods and devices. In addition, as opposed to for example the known gravimetric calibration method, fluids other than water or fluids with known density can be measured. The device according to the invention can measure volume directly and does not require the density of the fluid to be known in advance to compute the volume.

The device according to the invention preferably comprises a scale for measuring fluid columns within the channel, so that the device can be read out by a user directly through eye inspection or automatically by a vision- or a capacity-based system. A standard black and white camera with for example 640 times 480 pixels is, for example, sufficient to determine the length of a fluid column in a channel. Alternatively, a capacitive system that is specifically adapted to the device according to the invention can be used to measure the length of the fluid column in the channel.

Furthermore, as the channel of the device is constructed as a capillary the fluid pipetted into the loading part of the device is drawn into the channel and cannot easily evaporate. Hence, measurement accuracy is increased. This is especially important in life science where usually fluids in the amount of sub-microlitres up to millilitres are pipetted.

The method for calibrating a pipette or a dispensing system according to the invention comprises the steps of introducing a first volume of a fluid, preferentially a coloured fluid, into a loading port of a device according to the invention, recording a first length of the fluid column in a channel of the device, introducing a second volume of a fluid from the pipette or the dispensing system to be calibrated to the same loading port, recording a second length of the fluid column in the channel, and computing the volume dispensed by the pipette or the dispensing system by calculating the distance between the second length and the first length and multiplying the distance with the cross-section of the channel. The fluids used in the first and in the third step of the method may be different fluids.

The fluid introduced during the first step of the method is preferably coloured, in particular coloured in a dark dye, for better inspection. During the first step the first volume of the fluid is preferably introduced into the loading port until the first length of the fluid column amounts to approximately 5 to 50 millimetres. The colouring makes it easier for a user to detect the fluid column or the first length and the second length of the fluid column, respectively, within a channel. The computation of the volume in the last step of the method enables calibration of the pipette or the dispensing system.

The opening of the at least one channel, that is located opposite to the loading port, is preferably formed as excess fluid reservoir or as air-vent. That is, the at least one channel of the device according to the invention is preferably assigned an excess fluid reservoir, that is preferentially located at that end of the channel which is opposite to the end of the channel to which the loading port is connected. Alternatively, an opening in the form of an air-vent can be assigned to the at least one channel, that is preferentially located at that end of the channel which is opposite to the end of the channel to which the loading port is connected. The method for calibrating is repeatable until the fluid fills up the channel and has reached the opening, in particular the excess fluid reservoir or air-vent.

For determining the first length and the second length in particular a slider, preferentially a slider with a nonius can be used for easier determination of the first and the second length of the fluid column.

DESCRIPTION OF THE DRAWINGS

Further advantageous features and application of the invention will be found in the dependent claims as well as in the following description of the drawing illustrating the invention.

DESCRIPTION OF THE PREFERRED EMBODIMENT(S)

Figure 1:
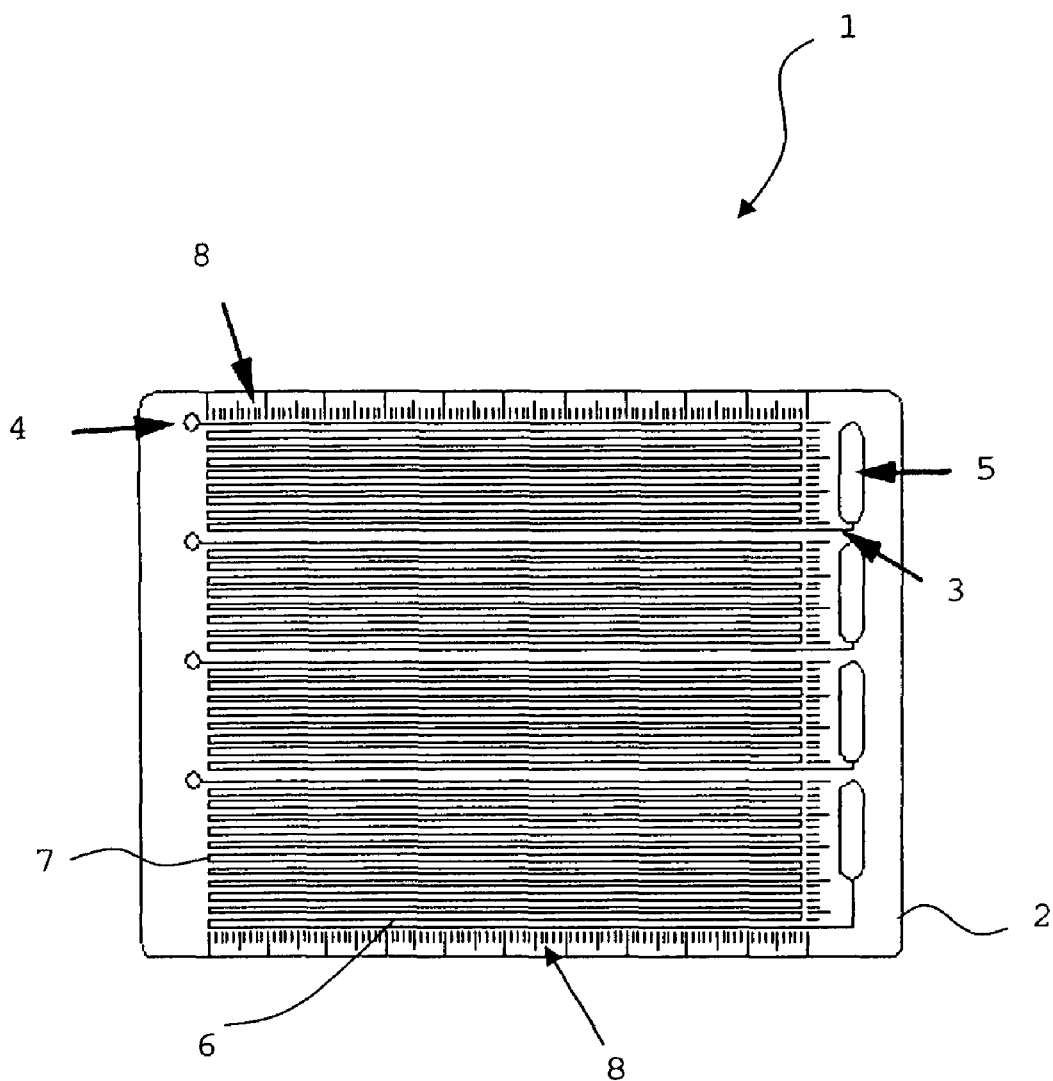
FIG. 1 shows a preferred embodiment or a device according to the invention.
Figure 2:
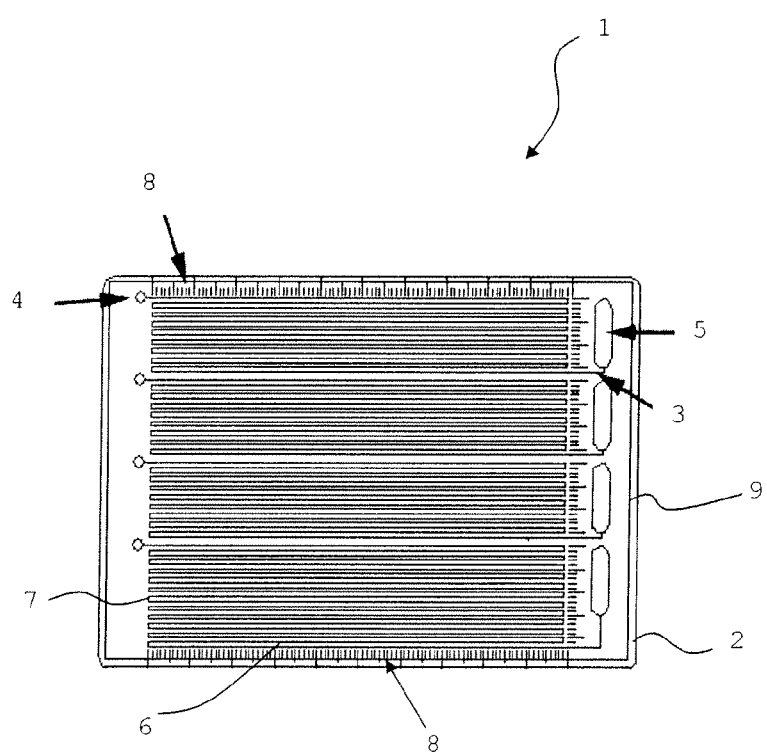
FIG. 2 shows a further embodiment of the invention in which the channel is located visibly in a surface of the plate and covered over by coated hydrophilic tape 9.

Device 1 for calibrating a pipette or a dispensing system comprises a plate 2 with four channels 3 within the shown surface of plate 2. Each channel 3 is assigned a loading port 4 and an excess fluid reservoir 5. By providing several channels 3 with corresponding loading ports 4 and excess fluid reservoirs 5 several pipettes or dispensing systems can be calibrated simultaneously. Loading ports 4 may for example have an inner diameter of 1 millimetre. They can be enlarged, preferably on one side, with a cone-shaped opening.

Channels 3 preferably take the course of a meander, the meander having longitudinal parts 6 and transverse parts 7 with transverse parts 7 preferentially being shorter than longitudinal parts 6. Of course, a channel 3 can also be constructed as one single line i.e. a single longitudinal part 6. Channels 3 preferably have no sharp edges. Possible bends of channels 3 are smooth or continuous, respectively. Longitudinal part 6 (including the transition to the transverse part 7) preferably has a length of 100 millimetres. Each longitudinal part 6 of a meander-formed channel 3 has preferably the same length. The same preferentially applies to the transverse parts 7.

Channels 3 may be provided in different sizes, in particular with different cross-sections, for different test volume ranges and different resolutions. Table 1 exemplarily shows the resolution of the device according to the invention for different channel cross-sections.

| Channel cross-section | Capacity/resolution |
|---|---|
| 0.05 millimetres × 0.05 millimetres | 2.5 nanolitres/millimetre |
| 0.1 millimetres × 0.1 millimetres | 10 nanolitres/millimetre |
| 0.2236 millimetres × 0.2236 millimetres | 50 nanolitres/millimetre |
| 0.3162 millimetres × 0.3162 millimetres | 100 nanolitres/millimetre |
| 0.25 millimetres × 1 millimetre | 250 nanolitres/millimetre |
| 1 millimetre × 1 millimetre | 1 microlitre/millimetre |
| 1.581 millimetres × 1.581 millimetres | 2.5 microlitres/millimetre |

The cross-sections of channels 3 do not necessarily have to be rectangular in shape, but may be at least partially curved, for example in the shape of a half-circle. A curved cross-section may lead to better wettability performances.

Loading port 4 is connected to one end of channel 3 and excess fluid reservoir 5 is connected to the other end of channel 3. If several channels 3 are provided for then their loading ports 4 are preferably located all on the same side of plate 2 and the excess fluid reservoirs 5 are preferably located on the opposite side. Loading ports 4 are preferentially arranged with a spacing of substantially 9 millimetres, 18 millimetres or any multiple of 9 millimetres from each other. If loading ports 4 are arranged with a spacing of 9 millimetres apart from each other then this arrangement would enable the calibration of a so-called multipipette, the several pipettes of the multipipette usually being 9 millimetres spaced apart.

If several channels 3 are provided on one plate 2 they do not necessarily all have to have the same dimensions. For example, channels 3 with different cross-sections (confer table 1) can be provided on the same plate 2. In such a way a wide volume range can be calibrated with the same device 1.

Pipetting systems usually comprise standard microtiter-plate carriers made of, for example, PS, PP, glass or metal. Plate 2 of device 1 advantageously has the same format as such a titer-plate, the format generally being 85.48 millimetres times 127.75 millimetres. By using the format of a pipetting system for plate 2, device 1 according to the invention becomes more user-friendly.

The device 1 preferably comprises a scale 8 for measuring the lengths a fluid columns within one or more channels 3, scale 8 preferentially being positioned in parallel to a longitudinal part 6 of a channel 3. More than one scale 8 can be provided on plate 2, for example one scale 8 being located above channels 3 and one scale 8 being located below channels 3. The resolution of the device 1 is given by the length of a longitudinal part 6 of a channel 3 divided by the number of length units of scale 8. The channel 3 is preferably covered over by coated hydrophilic tape 9. A slider, in particular a slider with a nonius, can be employed by a user to measure the length of a fluid column in a channel 3.

It is to be understood that while certain embodiments of the present invention have been illustrated and described herein, it is not to be limited to the specific embodiments described and shown.

The invention claimed is:

1. A device for calibrating a pipette or a dispensing system characterized by a plate, said plate comprising at least one channel with a loading port for receiving a test volume of a fluid at one end of the at least one channel and an opening at the other end of the at least one channel, wherein the at least one channel is constructed as a capillary wherein the channel takes the course of a meander, said meander having multiple longitudinal parts and multiple transverse parts wherein the transverse parts are shorter than the longitudinal parts and wherein the longitudinal parts are spaced apart and run in parallel and side by side to each other and the longitudinal parts are connected to each other by the transverse parts wherein the plate material comprises surface-treated plastic, with the surface having been treated with plasma and/or UV-light, to enhance the hydrophilic effect.

2. A device according to claim 1, wherein the channel is hydrophilic.

3. A device according to claim 1, wherein the opening is formed as excess fluid reservoir or as air-vent.

4. A device according to claim 1, wherein the plate material is transparent.

5. A device according to claim 1, wherein the plate material comprises PMMA, PC, COC, PS, PE or PP.

6. A device according to claim 1, wherein the at least one longitudinal part approximately has a length of 100 mm.

7. A device according to claim 1, wherein the plate comprises several channels.

8. A device according to claim 7, wherein each channel is assigned a loading port, said loading ports being arranged with a spacing of substantially 9 mm or a multiple thereof.

9. A method for calibrating a pipette or a dispensing system, comprising the steps of:
   introducing a first volume of a fluid into a loading port of a device according to claim 1,
   recording a first length of the fluid column in a channel of the device,
   introducing a second volume of a fluid from the pipette or the dispensing system to be calibrated to the same loading port,
   recording a second length of the fluid column in the channel, and
   computing the volume dispensed by the pipette or the dispensing system by calculating the difference between the second length and the first length and multiplying said difference with the cross-section of the channel.

10. A method according to claim 9, wherein the first volume of the fluid is introduced until the first length of the fluid column amounts to approximately 5 to 50 mm.

11. A device for calibrating a pipette or a dispensing system characterized by a plate, said plate comprising at least one channel with a loading port for receiving a test volume of a fluid at one end of the at least one channel and an opening at the other end of the at least one channel, wherein the at least one channel is constructed as a capillary wherein the channel takes the course of a meander, said meander having multiple longitudinal parts and multiple transverse parts wherein the transverse parts are shorter than the longitudinal parts and wherein the longitudinal parts are spaced apart and run in parallel and side by side to each other and the longitudinal parts are connected to each other by the transverse parts wherein the plate is coated to enhance the hydrophilic effect.

12. The device of claim 11 wherein the plate is sugar base coated.

13. The device of claim 11 wherein the plate material comprises glass; PMMA, PC, COC, PS, PE or PP.

14. A device for calibrating a pipette or a dispensing system characterized by a plate, said plate comprising at least one channel with a loading port for receiving a test volume of a fluid at one end of the at least one channel and an opening at the other end of the at least one channel, wherein the at least one channel is constructed as a capillary wherein the channel takes the course of a meander, said meander having multiple longitudinal parts and multiple transverse parts wherein the transverse parts are shorter than the longitudinal parts and wherein the longitudinal parts are spaced apart and run in parallel and side by side to each other and the longitudinal parts are connected to each other by the transverse parts, comprising a scale for measuring at least one fluid column within at least one channel.

15. The device of claim 14 wherein the scale is positioned in parallel to a longitudinal part of the channel.

16. The device of claim 14 wherein the plate material comprises glass; PMMA, PC, COC, PS, PE or PP.

* * * * *